(12) United States Patent
Nakai et al.

(10) Patent No.: US 6,686,044 B2
(45) Date of Patent: Feb. 3, 2004

(54) SURFACE-COATED CALCIUM CARBONATE PARTICLES, METHOD FOR MANUFACTURING SAME, AND ADHESIVE

(75) Inventors: Go Nakai, Tomioka (JP); Takao Fukuda, Kyoto-fu (JP); Kazuyuki Hosoi, Kawanishi (JP)

(73) Assignee: Shiraishi Kogyo Kaisha, Ltd., Osaka (JP)

( * ) Notice: Subject to any disclaimer, the term of this patent is extended or adjusted under 35 U.S.C. 154(b) by 0 days.

(21) Appl. No.: 10/000,350

(22) Filed: Dec. 4, 2001

(65) Prior Publication Data

US 2002/0102404 A1 Aug. 1, 2002

(30) Foreign Application Priority Data

Dec. 4, 2000 (JP) ........................................ 2000-368083

(51) Int. Cl.$^7$ ................................................. B32B 5/16
(52) U.S. Cl. ................. 428/403; 427/149.5; 427/149.8; 427/212; 427/220
(58) Field of Search ................................ 428/403, 219; 427/212, 220, 149.5, 149.8

(56) References Cited

U.S. PATENT DOCUMENTS 4,420,341 A * 12/1983 Ferrigno et al. ............ 106/308

FOREIGN PATENT DOCUMENTS

JP       4-31318       2/1992

\* cited by examiner

*Primary Examiner*—H. Thi Le
(74) *Attorney, Agent, or Firm*—Larson & Taylor PLC

(57) ABSTRACT

The calcium carbonate particles of the present invention are coated on their surface with (1) a fatty acid mixture comprising (1A) at least one of saturated fatty acids and salts thereof and (1B) at least one of unsaturated fatty acids and salts thereof, the (1A):(1B) weight ratio being in the range of 30:70 to 70:30, and (2) an organic compound such as a phthalic ester. The calcium carbonate particles of the invention easily disperse in the resin and other components that constitute an adhesive composition, and impart excellent viscosity stability and highly improved adhesion to the resulting adhesive.

15 Claims, No Drawings

SURFACE-COATED CALCIUM CARBONATE PARTICLES, METHOD FOR MANUFACTURING SAME, AND ADHESIVE

BACKGROUND OF THE INVENTION

(1) Field of the Invention

The present invention relates to modified calcium carbonate particles, to a method for producing these particles, and to an adhesive containing these particles.

(2) Description of the Related Art

When calcium carbonate is used as a filler for an adhesive, the calcium carbonate is required to exhibit certain properties, such as (a) being excellent in dispersibility in the resin and other components of the adhesive, (b) improving the adhesion between the adhesive and the adherend(s), and (c) stabilizing the viscosity of the adhesive during storage in the product container.

The reasons why the calcium carbonate particles need to have properties (a) to (c) are as follows.

The resin and other components must be mixed with calcium carbonate at a high shear force and for a long time to uniformly disperse the calcium carbonate particles in the resultant mixture. When the calcium carbonate has excellent dispersibility, less energy and time are needed, which leads to lower production cost.

When the adhesion is poor between an adhesive and its adherend, sliding (slip) occurs between the adherend and the adhesive before curing of the adhesive is complete. Consequently, the targeted bonding precision and sealing function cannot be obtained with the sliding remaining between the adherend and the adhesive.

When the viscosity or the thixotropic properties of an adhesive change while the adhesive is stored in its container, the adhesive becomes difficult to handle and bonding and sealing properties will be impaired, among other problems.

However, the conventional calcium carbonate materials are not satisfactory in the above required properties (a) to (c)

For instance, Japanese Unexamined Patent Publication No. 349846/1999 discloses a calcium carbonate material that has been surface treated with at least one compound selected from the group consisting of saturated fatty acids, unsaturated fatty acids, alicyclic carboxylic acids and resin acids. The Publication states that the treated calcium carbonate is suitable as a filler for resin, and that when the treated calcium carbonate is used as an additive in a curable resin composition, thermal resistance of the composition will be excellent during drying and superior thixotropic properties and slumping resistance and good storage stability can be imparted to the composition.

However, the thixotropic properties of the calcium carbonate are not satisfactory, and, as a result, the performance requirement (c) above is not fully met. Furthermore, the calcium carbonate is not sufficiently improved also in terms of the requirements (a) and (b) above.

SUMMARY OF THE INVENTION

It is an object of the present invention to provide calcium carbonate particles that fulfil the performance requirements (a) to (c) discussed above.

It is another object of the present invention to provide surface-coated calcium carbonate particles capable of easily dispersing in a mixture of resin and other components that constitute an adhesive composition, and imparting excellent viscosity stability and adhesion to the resulting adhesive.

It is a further object of the present invention to provide a method for producing the above-mentioned surface-coated calcium carbonate particles.

It is a further object of the present invention to provide an adhesive containing the above-mentioned surface-coated calcium carbonate particles.

The inventors conducted research aimed at achieving the stated objects. As a result, the inventors found that calcium carbonate particles excellent in properties (a) to (c) above can be obtainable by coating a starting calcium carbonate particles with (1) a mixture of (1A) at least one compound selected from the group consisting of saturated fatty acids and salts thereof and (1B) at least one compound selected from the group consisting of unsaturated fatty acids and salts thereof to form a first coating layer, and then coating the coated calcium carbonate particles with (2) a particular organic compound to form a second coating layer. The present invention was accomplished on the basis of above finding.

The invention provides surface-coated calcium carbonate particles, in which the surface of calcium carbonate particles is coated with a fatty acid mixture and further with an organic compound, the fatty acid mixture (1) comprising (1A) at least one compound selected from the group consisting of saturated fatty acids and salts thereof and (1B) at least one compound selected from the group consisting of unsaturated fatty acids and salts thereof, the (1A):(1B) weight ratio being in the range of 30:70 to 70:30, the coating amount of the fatty acid mixture being about 1 to about 3 mg per square meter of BET specific surface area of the surface-coated calcium carbonate particles, the organic compound being at least one member selected from the group consisting of phthalic esters, phosphoric esters, adipic esters, sebacic esters, azelaic esters, trimellitic esters and metal alkoxides, and the coating amount of the organic compound being about 0.1 to about 1 mg per square meter of BET specific surface area of the surface-coated calcium carbonate particles.

The present invention also provides the above-mentioned surface-coated calcium carbonate particles, wherein the BET specific surface area of the surface-coated calcium carbonate particles is about 10 to about 40 m²/g, the peak for primary pore diameter on a pore diameter distribution curve measured by mercury porosimetry is about 0.03 to about 0.08 μm, and the primary pore volume is about 0.1 to about 0.5 cm³/g.

The present invention also provides a method for producing surface-coated calcium carbonate particles comprising steps of:

coating calcium carbonate particles with (1) a fatty acid mixture comprising (1A) at least one compound selected from the group consisting of saturated fatty acids and salts thereof and (1B) at least one compound selected from the group consisting of unsaturated fatty acids and salts thereof to form a first coating layer, the (1A):(1B) weight ratio being in the range of 30:70 to 70:30, and the amount of coating fatty acid mixture being about 1 to about 3 mg per square meter of BET specific surface area of the surface-coated calcium carbonate particles, and coating the coated calcium carbonate particles with (2) at least one organic compound selected from the group consisting of phthalic esters, phosphoric esters, adipic esters, sebacic esters, azelaic esters, trimellitic esters and metal alkoxides to form a second coating layer, the amount of coating of the organic compound being in the range of about 0.1 to about 1 mg per square meter of BET specific surface area of surface-coated the calcium carbonate particles.

The present invention also provides an adhesive containing the above-mentioned surface-coated calcium carbonate particles having two coating layers.

The present invention also provides a method for imparting excellent viscosity stability and high adhesion to an adhesive by adding the above-mentioned modified calcium carbonate particles.

Other features of the present invention will become clear from the following description.

DETAILED DESCRIPTION OF THE INVENTION

Surface-coated Calcium Carbonate Particles

In the surface-coated calcium carbonate particles of the present invention, the particle surface has (i) a first coating layer of (1) a fatty acid mixture composed of (1A) at least one compound selected from the group consisting of saturated fatty acids and salts thereof and (1B) at least one compound selected from the group consisting of unsaturated fatty acids and salts thereof and (ii) a second coating layer of (2) at least one organic compound selected from the group consisting of phthalic esters, phosphoric esters, adipic esters, sebacic esters, azelaic esters, trimellitic esters and metal alkoxides.

The starting calcium carbonate particles can be any product produced by a known method. Therefore, the present invention allows the use of both natural calcium carbonate particles (heavy calcium bicarbonate particles) and synthetic calcium carbonate particles (light calcium carbonate particles and colloidal calcium carbonate particles). The BET specific surface area of the calcium carbonate materials is preferably about 12 to about 50 $m^2/g$, more preferably about 18 to about 30 $m^2/g$.

It is preferable for the starting calcium carbonate particles to have porosity characteristics such that the peak for primary pore diameter on a pore diameter distribution curve measured by mercury porosimetry is about 0.01 to about 0.15 $\mu$m, and the primary pore volume is about 0.05 to about 1 $cm^3/g$.

Natural calcium carbonate can be processed by mechanically crushing and grading calcareous ore to obtain particles adjusted to the desired size.

Synthetic calcium carbonate particles are manufactured by first preparing a calcium oxide (quick lime) by subjecting limestone to calcination by burning a fuel, such as coke, a petroleum fuel (such as heavy or light oil), natural gas, petroleum gas (LPG) or the like, and then reacting the calcium oxide with water to produce a calcium hydroxide slurry (milk of lime), and reacting the calcium hydroxide slurry with the carbon dioxide discharged from a calcination furnace for obtaining the calcium oxide from limestone to obtain the desired particle size and shape.

The surface-coated calcium carbonate particles of the present invention are produced, for example, by first coating the surface of calcium carbonate particles with a fatty acid mixture, and then coating the product with a specific organic compound.

The Fatty Acid Mixture

The fatty acid mixture comprises (1A) at least one compound selected from the group consisting of saturated fatty acids and salts thereof and (1B) at least one compound selected from the group consisting of unsaturated fatty acids and salts thereof.

The weight ratio of component (1A): component (1B) in the first coating layer is usually in the range of 30 to 70:70 to 30, preferably in the range of 35 to 65:65 to 35, per 100 parts the mixture (1).

Examples of saturated fatty acids include $C_6$ to $C_{31}$ saturated fatty acids. Specific examples of saturated fatty acids include caproic acid, caprylic acid, capric acid, lauric acid, myristic acid, palmitic acid, stearic acid, arachic acid, behenic acid, lignoceric acid, cerotic acid, montanic acid and melissic acid. Of these, palmitic acid, stearic acid and lauric acid are preferable.

Examples of salts of saturated fatty acids include sodium salts, potassium salts and other alkali metal salts of the above-mentioned saturated fatty acids; and magnesium salts, calcium salts and other alkaline earth metal salts of the above-mentioned saturated fatty acids. Sodium palmitate, sodium stearate and sodium laurate are preferable as salts of saturated fatty acids.

These saturated fatty acids and salts thereof can be used singly or in combination.

Examples of unsaturated fatty acids include $C_6$ to $C_{31}$ unsaturated fatty acids. Specific examples of unsaturated fatty acids include oleic acid, palmitoleic acid, erucic acid, caproleic acid, linderic acid, eicosenic acid and other unsaturated fatty acids having one double bond; linoleic acid and other unsaturated fatty acids having two double bonds; hiragoic acid, linolenic acid and other unsaturated fatty acids having three double bonds; arachidonic acid and other unsaturated fatty acids having four double bonds; and tariric acid and other unsaturated fatty acids having one or more triple bonds. Of these, unsaturated fatty acids having one double bond are preferable, and oleic acid and erucic acid are more preferable.

Examples of salts of unsaturated fatty acids include sodium salts, potassium salts and other alkali metal salts of the above-mentioned unsaturated fatty acids, and magnesium salts, calcium salts and other alkaline earth metal salts of the above-mentioned unsaturated fatty acids. Sodium oleate and sodium erucate are preferable as salts of unsaturated fatty acids.

These unsaturated fatty acids and salts thereof can be used singly or in combination.

It is essential in the invention to use a fatty acid mixture comprising (1A) and (1B) in the propotion as specified above. When the proportion is outside the specified range, the adhesive composition containing the surface-modified calcium carbonate particles exhibits inferior thixotropic properties and the applied adhesive composition sags during curing and does not adhere well to the adherend.

The modified calcium carbonate particles of the invention is coated with the above-mentioned fatty acid mixture, usually in an amount of about 1 to about 3 mg, preferably in an amount of about 1.5 to about 2.5 mg, per square meter of BET specific surface area of the surface-coated calcium carbonate particles. The objects of the present invention cannot be achieved when the amount of the fatty acid mixture is outside above-mentioned range.

The calcium carbonate particles formed of the first coating layer are further coated with a specific organic compound to form a second coating layer.

Organic Compound

The organic compound is at least one member selected from the group consisting of phthalic esters, phosphoric esters, adipic esters, sebacic esters, azelaic esters, trimellitic esters and metal alkoxides. Preferably, it is in the form of a liquid at 15° C. and 1 atmosphere.

Examples of phthalic esters include dimethyl phthalate (DMP), diethyl phthalate (DEP), dibutyl phthalate (DBP), diheptyl phthalate (DHP), di-n-octyl phthalate (DOP), di-2-ethylhexyl phthalate, diisononyl phthalate (DINP), octyldecyl phthalate and diisodecyl phthalate (DIDP).

Examples of phosphoric esters include tributyl phosphate (TBP), tri-2-ethylhexyl phosphate, trioctyl phosphate (TOP) and tricresyl phosphate (TCP).

Examples of adipic esters include di-n-hexyl adipate, di-2-ethylhexyl adipate and polypropylene adipate.

Examples of sebacic esters include dibutyl sebacate (DBS), dioctyl sebacate (DOS) and di-2-ethylhexyl sebacate.

Examples of azelaic esters include di-2-ethylhexyl azelate (DOZ).

Examples of trimellitic esters include tri-2-ethylhexyl trimellitate (TOTM).

Examples of metal alkoxides include those expressed by the general formula (1):

$$X_{4-n}\text{—}M(OR)_n \quad (1)$$

(where R is an alkyl group; X is an substituted or unsubstituted alkyl group, amino group, vinyl group, epoxy group or chlorine atom; M is Ti, Si or Al; and n is an integer from 1 to 4).

Specific examples of metal alkoxides in which M is titanium include isopropyl triisostearoyl titanate, isopropyl tridodecylbenzenesulfonyl titanate, isopropyl tris(dioctylpyrophosphate)titanate, tetraisopropyl bis(dioctylphosphite)titanate, tetraoctyl bis(ditridecylphosphite)titanate, tetra(2,2-diallyloxymethyl-1-butyl) bis(di-tridecyl)phosphite titanate, bis(dioctylpyro-phosphate) oxyacetate titanate, bis(dioctylpyrophosphate)ethylene titanate, isopropyl trioctanoyl titanate, isopropyl dimethacrylisostearoyl titanate, isopropyl isostearoyldiacryl titanate, isopropyl tri(dioctylphosphate)titanate, isopropyl tricumylphenyl titanate, isopropyl tri(N-amidoethyl-aminoethyl)titanate, dicumyl phenyloxyacetate titanate and diisostearoyl ethylene titanate.

Specific examples of metal alkoxides in which M is silicon include vinyltriethoxysilane, vinyltris(2-methoxyethoxy)silane, 3-methacryloxypropyltrimethoxysilane, 3-glycidoxy-propyltrimethoxysilane, 2-(3,4-epoxycyclohexyl)ethyltrimethoxysilane, N-(2-aminoethyl)-3-aminopropyltrimethoxysilane, N-(2-aminoethyl)-3-aminopropylmethyldimethoxysilane, 3-aminopropyltriethoxysilane, N-phenyl-3-aminopropyltrimethoxysilane, 3-mercaptopropyl-trimethoxysilane and 3-chloropropyltrimethoxysilane.

Specific examples of metal alkoxides in which M is aluminum include acetoalkoxyaluminum diisopropylate.

Of the various organic compounds listed above, phthalic esters, phosphoric esters and adipic esters are preferable.

Of these organic compounds, diisononyl phthalate, tricresyl phosphate, polypropylene adipate and di-2-ethylhexyl adipate are preferable, and diisononyl phthalate, tricresyl phosphate and polypropylene adipate are more preferable.

The above-mentioned organic compounds can be used singly or in combination in the present invention.

An adhesive that contains calcium carbonate particles whose surface is coated with the second layer composed of an organic compound other than the specific organic compound mentioned above has inferior thixotropic properties, and when the adhesive is applied to an adherend, it sags while being cured, and its adhesion to the adherend is also poor.

It is essential in the invention to use a combination of fatty acid mixture and above-mentioned specific organic compound. An adhesive containing calcium carbonate particles whose surface is coated with either a fatty acid mixture or a specific organic compound alone, has inferior thixotropic properties, and when the adhesive is applied to an adherend, it sags while being cured, and its adhesion to the adherend is also poor. Furthermore, calcium carbonate particles whose surface is coated only with a fatty acid mixture or a specific organic compound has inferior dispersibility in resin and other components.

The surface of the surface-coated calcium carbonate particles of the present invention is coated with the above-mentioned organic compound, usually in an amount of about 0.1 to about 1 mg, preferably in an amount of about 0.15 to about 0.5 mg, per square meter of BET specific surface area of the surface-coated calcium carbonate particles. The objects of the present invention cannot be achieved when the coating amount of the organic compound is outside the specified range.

To obtain surface-coated calcium carbonate particles with particularly excellent dispersibility and viscosity, it is preferable for the surface-coated calcium carbonate particles to have a BET specific surface area of about 10 to about 40 $m^2/g$, and a BET specific surface area of about 15 to about 25 $m^2/g$ is more preferable.

To obtain surface-coated calcium carbonate particles with particularly excellent dispersibility and viscosity, it is preferable for the surface-coated calcium carbonate particles to have porosity characteristics such that the peak for primary pore diameter on a pore diameter distribution curve measured by mercury porosimetry is about 0.03 to about 0.08 $\mu$m, and the primary pore volume is about 0.1 to about 0.5 $cm^3/g$. It is more preferable that the peak for primary pore diameter is about 0.035 to about 0.07 $\mu$m, and the primary pore volume is about 0.15 to about 0.45 $cm^3/g$.

The pore diameter and pore volume of the surface-coated calcium carbonate particles and non-coated calcium carbonate particles are measured using a mercury porosimetric pore diameter measurement apparatus. The maximum injection pressure with above apparatus is 190 MPas, and the minimum measurable pore diameter is 0.008 $\mu$m. The pore volume is determined directly from the volume when the pores of the calcium carbonate particles are filled with mercury, while the pore diameter is determined from the surface tension of the mercury and the pressure when the pores of the calcium carbonate particles are filled with mercury. The median diameter of the peak closest to the minimum measurable pore diameter on the pore distribution curve is termed the primary pore diameter, and the maximum volume included in the peak is termed the primary pore volume.

In the present invention, the coating amount of the fatty acid mixture and the coating amount of the particular organic compound are determined by conventional ways, such as by ether extraction and gas chromatography. More specifically, when the surface-coated calcium carbonate particles of the present invention are dipped in diethyl ether, the saturated fatty acid, the unsaturated fatty acid and the organic compound are extracted in diethyl ether, so the total amount of saturated fatty acid, unsaturated fatty acid and organic compound forming coating layers on the calcium carbonate particles can be determined. The diethyl ether extract is then passed through a gas chromatography, and the proportion of the various components contained in the extract is established, respective amounts of the saturated fatty acid, the unsaturated fatty acid and the organic compound are determined from the proportion and the total amount of the components. The amount of fatty acid mixture is the sum of the amount of the saturated fatty acid and the amount of the unsaturated fatty acid.

The BET specific surface area of the surface-coated calcium carbonate particles and the BET specific surface area of the non-coated calcium carbonate particles are measured in a known manner, using a specific surface area measurement apparatus.

Method for Producing Surface-coated Calcium Carbonate Particles

The calcium carbonate particles to be coated may be dried calcium carbonate particles, or they may be in the form of a slurry in which the calcium carbonate particles are dispersed in water or an organic solvent such as toluene, xylene, hexane, methyl alcohol or ethyl alcohol.

When the calcium carbonate particles are in the dried state, the fatty acid mixture is added to the dry calcium carbonate particles and heated while being forcibly mixed under agitation, which yields calcium carbonate particles coated with a fatty acid mixture that has been adjusted to the desired particle size and pore volume.

When the calcium carbonate particles are in the form of a slurry, the fatty acid mixture is added to the calcium carbonate slurry and stirred to form an adsorption layer (coating layer) of the fatty acid mixture on the calcium carbonate surface. Then the slurry is dehydrated in a centrifuge, filter press or other such dehydration machine, and the dehydrate thus obtained is dried with hot air. The dryer can be a hot air cage dryer, band dryer, spray dryer or the like. The dried calcium carbonate particles coated with the fatty acid mixture is disintegrated or dispersed, when they are in larger agglomerated pieces, to finely adjust them to the desired size and pore volume.

These calcium carbonate particles that have been coated with a fatty acid mixture are further coated with the above-mentioned specific organic compound in the invention.

The coating by the organic compound is accomplished, for example, by heating the organic compound to vaporize, and bringing the vapor of organic compound into contact with the fatty acid mixture-coated calcium carbonate particles.

Alternatively, the surface of the fatty acid mixture-coated calcium carbonate particles can be coated with the organic compound by a variety of different methods, such as a method in which air, nitrogen, or any suitable gas is blown into an organic compound in a liquid state so that the organic compound is brought into contact with the fatty acid mixture-coated calcium carbonate particles along with the gas, or a method in which a liquid organic compound is added to the fatty acid mixture-coated calcium carbonate particles, and the mixture of the liquid organic compound and the fatty acid mixture-coated calcium carbonate particles is heated while being stirred so as to bring the two into uniform contact with each other.

The surface-coated calcium carbonate particles of the present invention are used, for example, by being added to an adhesive. The modified calcium carbonate particles of the invention is highly useful as a filler for an adhesive.

Adhesive

The term "adhesive" as used in the present invention means a material that is placed between two materials to be bonded (adherends) and exhibit a bonding action. Therefore, the adhesive referred to in the present invention encompasses commonly used low-viscosity adhesives (such as paper adhesives and wood adhesives), as well as high-viscosity adhesives capable of simultaneously exhibiting a filler action for filling in a gap (space) between two materials to be bonded, and a bonding action that affords elasticity, elongation, and so forth after curing (such as construction adhesives, construction sealants, and automotive sealants).

The adhesive containing surface-coated calcium carbonate particles of the present invention will now be described in detail.

The adhesive of the present invention includes various types of adhesives, such as thermoplastic resin-based adhesives, thermosetting resin-based adhesives, rubber-based adhesives, and sealants.

The surface-modified calcium carbonate particles of the invention are incorporating as a filler in the adhesive of the present invention. Excepting that the filler is the surface-coated calcium carbonate particles of the present invention, the adhesive of the present invention may be the same as conventional adhesives in terms of its other components.

Specifically, the adhesive of the present invention comprises components required according to the type of adhesive, such as curing agent, curing promoter, colorant, solvent and the like, in addition to the resin component, plasticizer, and surface-coated calcium carbonate particles of the present invention used as a filler.

The resin component can be any known resin component added to the above types of adhesive.

Examples of resin components used in thermoplastic resin-based adhesives include polyvinyl chloride, polyvinyl butyrate, polyvinyl alcohol, polystyrene, polyacrylate, polymethacrylate and other vinyl resins; polyethylene, polypropylene, ethylene-vinyl acetate copolymers (EVA) and other polyolefin resins; and polyamides. These resins can be used singly or in combination.

Examples of resin components used in thermosetting resin-based adhesives include urethane resin, melamine resin, phenol resin, resorcinol resin, epoxy resin, isocyanate resin and polyimide resin. These resins can be used singly or in combination.

Examples of resin components used in rubber-based adhesives include chloroprene rubber, styrene-butadiene rubber, acrylonitrile-butadiene rubber, butyl rubber and acrylic rubber. These resins can be used singly or in combination.

Examples of resin components contained in sealants include silicone resin, modified silicone resin, sulfide resin, urethane resin, chloroprene rubber and butyl rubber. These resins can be used singly or in combination.

A wide range of known plasticizers usually used in this field can be used in the adhesive of the present invention. Examples of such plasticizers include di-n-butyl phthalate, di-2-ethylhexyl phthalate (DOP), di-n-octyl phthalate (n-DOP), diisodecyl phthalate (DIDP), diisononyl phthalate (DINP) and other phthalic esters; dioctyl adipate, diisodecyl adipate and other non-aromatic dibasic esters; trioctyl phosphate, tris(chloroethyl)phosphate, tri (dichloropropyl)phosphate and other phosphoric esters; as well as various polyester-based plasticizers and sulfonic ester-based plasticizers. These can be used singly or in combination. Of the above plasticizers, a phthalic ester is preferred, DOP is more preffered.

The amount of the plasticizer is preferably about 10 to about 200 weight parts, and more preferably about 50 to about 150 weight parts, per 100 weight parts of the resin component. Keeping the plasticizer content within above-mentioned range allows the viscosity of the adhesive to be adjusted so that the product is easier to work with.

The surface-coated calcium carbonate particles of the invention can be incorporated as a filler in any of the adhesives explained above. The amount of the calcium carbonate particles of the invention is preferably about 10 to about 200 weight parts, more preferably about 30 to about 200 weight parts, per 100 weight parts of the resin component. Keeping the content of the calcium carbonate particles of the present invention within above-mentioned range imparts excellent thixotropic properties, adhesion, and viscosity stability to the adhesive.

In the present invention, other known fillers can also be added along with the calcium carbonate particles of the present invention insofar as the properties of the adhesive is adversely affected. Examples of such fillers include heavy calcium carbonate, carbon black, clay, talc, titanium oxide, calcined lime, kaolin, zeolite, diatomaceous earth, vinyl chloride paste resin, glass balloons and vinylidene chloride resin balloons. These fillers can be used singly or in combination.

A wide range of curing agents, curing promoters, colorants, solvents, and various other additives usually used in this field can be used here. For instance, examples of colorants include titanium oxide, zinc oxide, ultramarine blue, red oxide, lithopone, lead, cadmium, iron, cobalt, aluminum, hydrochlorides, sulfates and other such inorganic pigments; and azo pigments, copper phthalocyanine pigments and other such organic pigments. Examples of solvents include xylene, toluene and other aromatic hydrocarbons; hexane, heptane, octane and other aliphatic hydrocarbons; petroleum solvents ranging from gasoline to kerosene; acetone, methyl ethyl ketone, methyl isobutyl ketone and other ketones; and cellosolve acetate, butyl cellosolve acetate and other ether esters.

The amounts of these various components are the same as in conventional adhesives.

The adhesive of the invention may be a dispersion type adhesive, such as an aqueous dispersion or an organic solvent dispersion, or it may be an emulsion type adhesive. A preferred adhesive is one in which the resin component is polyvinyl chloride, silicone resin, modified silicone resin or urethane resin, and the surface-coated calcium carbonate particles of the invention are included as a filler.

The present invention provides calcium carbonate particles with excellent properties (a) to (c) above.

The present invention provides modified calcium carbonate particles capable of easily dispersing in the mixture of resin and other components that constitute an adhesive composition, and impart excellent viscosity stability and high improved adhesion to the resulting adhesive.

EXAMPLES

The present invention will be described in more detail by examples and comparative examples, but the scope of the present invention is not limited to or by these examples.

Example 1

A slurry of synthetic calcium carbonate particles (BET specific surface area: 19 m$^2$/g) with a solids content of 10 wt % was adjusted to 65° C. While the slurry was stirred with a disperser, a fatty acid mixture with a sodium oleate content of 60 wt %, a sodium stearate content of 20 wt % and a sodium palmitate content of 20 wt % was added, and stirring was followed by press dehydration. The filter cake thus obtained was dried in a chamber dryer, after which it was disintegrated to obtain surface-coated calcium carbonate particles that were coated with the fatty acid mixture.

While the surface-coated calcium carbonate particles thus obtained were being dispersed with a dry disperser, diisononyl phthalate was heated and vaporized and mixed with heated dry air, after which the mixed gas was brought into contact with the calcium carbonate particles whose surface was coated with the fatty acid mixture. This yielded surface-coated calcium carbonate particles that were coated with the fatty acid mixture and further coated with diisononyl phthalate.

Table 1 shows the properties of the surface-coated calcium carbonate particles thus obtained.

Example 2

Except for increasing the coating amount of the fatty acid mixture, calcium carbonate particles whose surface was coated with a fatty acid mixture and diisononyl phthalate were obtained in the same manner as in Example 1.

Table 1 shows the properties of the surface-coated calcium carbonate particles thus obtained.

Example 3

Except for decreasing the coating amount of the fatty acid mixture, calcium carbonate particles whose surface was coated with a fatty acid mixture and diisononyl phthalate were obtained in the same manner as in Example 1.

Table 1 shows the properties of the surface-coated calcium carbonate particles thus obtained.

Example 4

Except for using polypropylene adipate instead of diisononyl phthalate, calcium carbonate particles whose surface was coated with a fatty acid mixture and polypropylene adipate were obtained in the same manner as in Example 1.

Table 1 shows the properties of the surface-coated calcium carbonate particles thus obtained.

Example 5

Except for using tricresyl phosphate instead of diisononyl phthalate, calcium carbonate particles whose surface was coated with a fatty acid mixture and tricresyl phosphate were obtained in the same manner as in Example 1.

Table 1 shows the properties of the surface-coated calcium carbonate particles thus obtained.

Example 6

Except for using synthetic calcium carbonate particles with a BET specific surface area of 25 m$^2$/g, calcium carbonate particles whose surface was coated with a fatty acid mixture and diisononyl phthalate were obtained in the same manner as in Example 1.

Table 1 shows the properties of the surface-coated calcium carbonate particles thus obtained.

Comparative Example 1

Except for not coating the calcium carbonate particles with the fatty acid mixture, calcium carbonate particles whose surface was coated with diisononyl phthalate were obtained in the same manner as in Example 1.

Table 1 shows the properties of the surface-coated calcium carbonate particles thus obtained.

Comparative Example 2

Except for changing the fatty acid mixture to one with a sodium oleate content of 20 wt %, a sodium stearate content of 50 wt % and a sodium palmitate content of 30 wt %, calcium carbonate particles whose surface was coated with a fatty acid mixture and diisononyl phthalate were obtained in the same manner as in Example 1.

Table 1 shows the properties of the surface-coated calcium carbonate particles thus obtained.

Comparative Example 3

Except for changing the fatty acid mixture to one with a sodium oleate content of 85 wt %, a sodium stearate content of 10 wt% and a sodium palmitate content of 5 wt %, calcium carbonate particles whose surface was coated with a fatty acid mixture and diisononyl phthalate were obtained in the same manner as in Example 1.

Table 1 shows the properties of the surface-coated calcium carbonate particles thus obtained.

Comparative Example 4

Except for not coating the calcium carbonate particles with the diisononyl phthalate, calcium carbonate particles whose surface was coated with a fatty acid mixture were obtained in the same manner as in Example 1.

Table 1 shows the properties of the surface-coated calcium carbonate particles thus obtained.

Comparative Example 5

Except for not coating the calcium carbonate particles with the fatty acid mixture, calcium carbonate particles whose surface was coated with diisononyl phthalate were obtained in the same manner as in Example 6.

Table 1 shows the properties of the surface-coated calcium carbonate particles thus obtained.

TABLE 1

|  | BET specific surface area ($m^2/g$) | Fatty acid mixture coating amount ($mg/m^2$) | Unsaturated fatty acid coating amount ($mg/m^2$) | Organic compound coating Amount ($mg/m^2$) | Peak of primary pore diameter ($\mu m$) | Primary pore volume ($cm^3/g$) |
|---|---|---|---|---|---|---|
| Ex. 1 | 17.2 | 2.1 | 1.2 | 0.18 | 0.050 | 0.21 |
| Ex. 2 | 16.5 | 2.9 | 1.7 | 0.18 | 0.051 | 0.22 |
| Ex. 3 | 17.7 | 1.1 | 0.65 | 0.17 | 0.052 | 0.20 |
| Ex. 4 | 17.0 | 2.2 | 1.1 | 0.19 | 0.052 | 0.20 |
| Ex. 5 | 17.3 | 2.1 | 1.2 | 0.17 | 0.050 | 0.22 |
| Ex. 6 | 23.1 | 2.1 | 1.2 | 0.19 | 0.040 | 0.20 |
| C.E. 1 | 18.5 | 0 | 0 | 0.18 | 0.052 | 0.22 |
| C.E. 2 | 17.0 | 2.0 | 0.41 | 0.17 | 0.052 | 0.22 |
| C.E. 3 | 17.2 | 2.0 | 1.7 | 0.18 | 0.050 | 0.21 |
| C.E. 4 | 16.9 | 2.1 | 1.2 | 0 | 0.052 | 0.22 |
| C.E. 5 | 24.7 | 0 | 0 | 0.18 | 0.040 | 0.20 |

[C.E.: Comparative Example]

The BET specific surface area of the surface-coated calcium carbonate particles was measured by the nitrogen gas absorption method using a specific surface area measurement apparatus (trade name: Flowsorb II 2300, a product of Shimadzu Corporation).

The coating amount of the fatty acid mixture, the coating amount of unsaturated fatty acid and the coating amount of the particular organic compound was determined using a gas chromatography (trade name: model GC-17, a product of Shimadzu Corporation).

The pore diameter and pore volume of the surface-coated calcium carbonate particles were measured using a mercury porosimetric pore diameter measurement apparatus (trade name: Porosimeter 2000, a product of Carlo Erba Instruments).

Test Example 1

TABLE 2

| Component | Weight parts |
|---|---|
| Polyvinyl chloride | 30 |
| Diisononyl phthalate | 30 |
| surface-coated calcium carbonate particles | 20 |
| heavy calcium carbonate | 15 |
| polyamidoamine (adhesion imparter) | 1 |
| petroleum spirits (diluent) | 1 |

Polyvinyl chloride: trade name Zest P21, a product of Shin Daiichi Vinyl Chloride Polyvinyl chloride (PVC) sol adhesives were produced from the components in Table 2 for the various surface-coated calcium carbonate particles obtained,in the above examples and comparative examples, and the dispersibility of the particles in the PVC sol and the adhesion between the PVC sol adhesive and an adherend made of brass were tested. The viscosity stability of the PVC sols was also tested.

The dispersibility in a PVC sol was tested visually from the number of surface-coated calcium carbonate particles not completely dispersed in the resulting PVC sol. Specifically, a sheet of black paper was coated with the PVC sol containing the surface-coated calcium carbonate particles using a 500 $\mu$m applicator, and the number of particles 0.1 mm or larger contained within a five square centimeter area of the coated surface was counted.

These results are given in Table 3.

The adhesion between the PVC sol adhesive and the adherend was measured by the method set forth in JIS A 1439, section 4.1. These results are also given in Table 3.

The viscosity stability of the PVC sol was determined by measuring the initial viscosity of the PVC sol and the viscosity after 7 days of storage at 45° C., and calculating the change. The viscosity was measured at a temperature of 20° C. with a BH viscometer (a product of Tokimec) at speeds of 2 rpm and 20 rpm.

These results are also given in Table 3.

The proportional increase is expressed as a relative value (%) when the viscosity of the PVC prior to storage (the initial viscosity of the PVC sol) is 100%.

TABLE 3

|  | Dispersibility (number) | Adhesion (mm) | Initial viscosity (Pa · s) | | Viscocity after 7 days at 45° C. (Pa · s) | | Increase in viscosity (%) | |
|---|---|---|---|---|---|---|---|---|
|  |  |  | 2 rpm | 20 rpm | 2 rpm | 20 rpm | 2 rpm | 20 rpm |
| Ex. 1 | 0 | 0 | 694 | 98.6 | 702 | 102 | 101.2 | 103.4 |
| Ex. 2 | 0 | 0 | 710 | 106 | 712 | 112 | 100.3 | 105.7 |
| Ex. 3 | 0 | 0 | 658 | 92.4 | 678 | 97.0 | 103.0 | 105.0 |

TABLE 3-continued

|  | Dispersibility (number) | Adhesion (mm) | Initial viscosity (Pa·s) 2 rpm | Initial viscosity (Pa·s) 20 rpm | Viscocity after 7 days at 45° C. (Pa·s) 2 rpm | Viscocity after 7 days at 45° C. (Pa·s) 20 rpm | Increase in viscosity (%) 2 rpm | Increase in viscosity (%) 20 rpm |
|---|---|---|---|---|---|---|---|---|
| Ex. 4 | 0 | 0 | 702 | 106 | 710 | 110 | 101.1 | 103.8 |
| Ex. 5 | 0 | 0 | 680 | 98.4 | 690 | 98.2 | 101.5 | 99.8 |
| Ex. 6 | 3 | 0 | 480 | 64.0 | 492 | 65.0 | 102.5 | 101.6 |
| C.E. 1 | 25 | 18 | 652 | 98.8 | 734 | 120 | 112.6 | 121.5 |
| C.E. 2 | 30 | 20 | 824 | 138 | 990 | 166 | 120.1 | 120.3 |
| C.E. 3 | 50 | 10 | 536 | 76.6 | 498 | 65.4 | 92.9 | 85.4 |
| C.E. 4 | 28 | 26 | 622 | 90.4 | 714 | 110 | 114.8 | 121.7 |
| C.E. 5 | 68 | 34 | 436 | 58.8 | 490 | 64.4 | 112.4 | 109.5 |

It can be seen from the results in Table 3 that when the surface-coated calcium carbonate particles of the invention are added to the PVC sol, they readily disperse in the PVC sol, the adhesion is excellent between the PVC sol and the adherend, and the resulting PVC sol undergoes little change in viscosity.

Example 7

Except for using a fatty acid mixture with a sodium oleate content of 60 wt % and a sodium stearate content of 40 wt %, calcium carbonate particles whose surface was coated with a fatty acid mixture and diisononyl phthalate were obtained in the same manner as in Example 1.

Example 8

Except for using a fatty acid mixture with a sodium oleate content of 60 wt % and a sodium palmitate content of 40 wt %, calcium carbonate particles whose surface was coated with a fatty acid mixture and diisononyl phthalate were obtained in the same manner as in Example 1.

Example 9

Except for using a fatty acid mixture with an oleic acid content of 60 wt %, a stearic acid content of 20 wt % and a palmitic acid content of 20 wt %, calcium carbonate particles whose surface was coated with a fatty acid mixture and diisononyl phthalate were obtained in the same manner as in Example 1.

Example 10

Except for using a fatty acid mixture with a sodium erucate content of 60 wt %, a sodium stearate content of 20 wt % and a sodium palmitate content of 20 wt %, calcium carbonate particles whose surface was coated with a fatty acid mixture and diisononyl phthalate were obtained in the same manner as in Example 1.

Example 11

Except for using a fatty acid mixture with a sodium oleate content of 60 wt % and a sodium laurate content of 40 wt %, calcium carbonate particles whose surface was coated with a fatty acid mixture and diisononyl phthalate were obtained in the same manner as in Example 1.

Example 12

Except for using a fatty acid mixture with a sodium oleate content of 40 wt %, a sodium stearate content of 30 wt % and a sodium palmitate content of 30 wt %, calcium carbonate particles whose surface was coated with a fatty acid mixture and diisononyl phthalate were obtained in the same manner as in Example 1.

Example 13

Except for using a fatty acid mixture with a sodium oleate content of 40 wt % and a sodium stearate content of 60 wt %, calcium carbonate particles whose surface was coated with a fatty acid mixture and diisononyl phthalate were obtained in the same manner as in Example 1.

Example 14

Except for using a fatty acid mixture with a sodium oleate content of 40 wt % and a sodium palmitate content of 60 wt %, calcium carbonate particles whose surface was coated with a fatty acid mixture and diisononyl phthalate were obtained in the same manner as in Example 1.

Example 15

Except for using butyl sebacate instead of diisononyl phthalate, calcium carbonate particles whose surface was coated with a fatty acid mixture and butyl sebacate were obtained in the same manner as in Example 1.

Example 16

Except for using di-2-ethylhexyl azelate instead of diisononyl phthalate, calcium carbonate particles whose surface was coated with a fatty acid mixture and di-2-ethylhexyl azelate were obtained in the same manner as in Example 1.

Example 17

Except for using tri-2-ethylhexyl trimellitate instead of diisononyl phthalate, calcium carbonate particles whose surface was coated with a fatty acid mixture and tri-2-ethylhexyl trimellitate were obtained in the same manner as in Example 1.

Example 18

Except for using isopropyl triisostearoyl titanate instead of diisononyl phthalate, calcium carbonate particles whose surface was coated with a fatty acid mixture and isopropyl triisostearoyl titanate were obtained in the same manner as in Example 1.

Example 19

Except for using vinyltriethoxysilane instead of diisononyl phthalate, calcium carbonate particles whose surface was coated with a fatty acid mixture and vinyltriethoxysilane were obtained in the same manner as in Example 1.

Example 20

Except for changing the coating amount of diisononyl phthalate to 0.9 mg per square meter of BET specific surface area of synthetic calcium carbonate particles (BET specific surface area: 19 $m^2/g$), calcium carbonate particles whose surface was coated with a fatty acid mixture and diisononyl phthalate were obtained in the same manner as in Example 1.

Example 21

Except for using synthetic calcium carbonate particles with a BET specific surface area of 10 m²/g, calcium carbonate particles whose surface was coated with a fatty acid mixture and diisononyl phthalate were obtained in the same manner as in Example 1.

Example 22

Except for using synthetic calcium carbonate particles with a BET specific surface area of 35 m²/g, calcium carbonate particles whose surface was coated with a fatty acid mixture and diisononyl phthalate were obtained in the same manner as in Example 1.

Example 23

Except for using di-2-ethylhexyl adipate instead of diisononyl phthalate, calcium carbonate particles whose surface was coated with a fatty acid mixture and di-2-ethylhexyl adipate were obtained in the same manner as in Example 1.

Test Example 2

Polyvinyl chloride (PVC) sol adhesives were produced from the components in Table 2 above for the various surface-coated calcium carbonate particles obtained in the above Examples 7 to 23, and the dispersibility of the particles in the PVC sol and the adhesion between the PVC sol adhesive and an adherend made of brass were tested in the same way as in Test Example 1. The viscosity stability of the PVC sols was also tested.

As a result, all of the polyvinyl chloride (PVC) sol adhesives exhibited excellent dispersibility, adhesion, and viscosity stability.

Test Example 3

TABLE 4

| Component | Weight parts |
| --- | --- |
| Modified silicone resin | 100 |
| diisononyl phthalate | 60 |
| surface-coated calcium carbonate particles | 100 |
| castor oil | 15 |
| tin octylate | 0.1 |

Modified silicone resin: trade name MS Polymer S203, a product of Kaneka Corporation Single-component modified silicone sealants were prepared from the components in Table 4 for the various surface-coated calcium carbonate particles obtained in the above Examples 1 to 6 and Comparative Examples 1 to 5.

Next, the dispersibility of the surface-coated calcium carbonate particles in the single-component modified silicone sealant and the adhesion between the single-component modified silicone sealant and an adherend made of brass were tested, and the viscosity stability of the single-component modified silicone sealant was also tested, in the same manner as in Test Example 1.

The results are given in Table 5.

TABLE 5

| | Dispersibility (number) | Adhesion (mm) | Initial viscosity (Pa · s) | | Viscosity after 7 days at 45° C. (Pa · s) | | Increase in viscosity (%) | |
| --- | --- | --- | --- | --- | --- | --- | --- | --- |
| | | | 2 rpm | 20 rpm | 2 rpm | 20 rpm | 2 rpm | 20 rpm |
| Ex. 1 | 0 | 0 | 850 | 150 | 868 | 154 | 102.1 | 102.7 |
| Ex. 2 | 0 | 0 | 866 | 154 | 914 | 160 | 105.5 | 103.9 |
| Ex. 3 | 0 | 0 | 812 | 142 | 840 | 146 | 103.4 | 102.8 |
| Ex. 4 | 0 | 0 | 856 | 150 | 891 | 160 | 104.1 | 106.7 |
| Ex. 5 | 0 | 0 | 850 | 148 | 880 | 156 | 103.5 | 105.4 |
| Ex. 6 | 5 | 0 | 890 | 156 | 900 | 160 | 101.1 | 102.6 |
| C.E. 1 | 28 | 26 | 820 | 164 | 994 | 214 | 121.2 | 130.5 |
| C.E. 2 | 27 | 16 | 856 | 160 | 994 | 178 | 116.1 | 111.3 |
| C.E. 3 | 41 | 15 | 812 | 150 | 1072 | 188 | 132.0 | 125.3 |
| C.E. 4 | 35 | 21 | 844 | 148 | 1110 | 200 | 131.5 | 135.1 |
| C.E. 5 | 54 | 28 | 750 | 156 | 1142 | 220 | 152.3 | 141.0 |

It can be seen from Table 5 that the dispersibility of the surface-coated calcium carbonate particles obtained in Examples 1 to 6 in the single-component modified silicone sealants is excellent, and that the single-component modified silicone sealants containing the surface-coated calcium carbonate particles obtained in Examples 1 to 6 all have excellent adhesion and viscosity stability.

Test Example 4

TABLE 6

| Component | Weight parts |
| --- | --- |
| Base | |
| modified silicone resin | 100 |
| diisononyl phthalate | 60 |
| castor oil | 5 |
| heavy calcium carbonate | 30 |
| surface-coated calcium carbonate particles | 100 |
| Curing agent | |
| tin octylate | 0.1 |
| diisononyl phthalate | 5 |
| heavy calcium carbonate | 20 |

Modified silicone resin: trade name MS Polymer S203, a product of Kaneka Corporation Two-component modified silicone sealants were prepared from the components in Table 6 for the various surface-coated calcium carbonate particles obtained in the above Examples 1 to 6 and Comparative Examples 1 to 5.

Next, the dispersibility of the surface-coated calcium carbonate particles in the two-component modified silicone sealant and the adhesion between the two-component modified silicone sealant and an adherend made of brass were tested, and the viscosity stability of the two-component modified silicone sealant was also tested, in the same manner as in Test Example 1.

The results are given in Table 7.

TABLE 7

|  | Dispersibility | Adhesion | Initial viscosity (Pa · s) | | Viscocity after 7 days at 45° C. (Pa · s) | | Increase in viscosity (%) | |
| --- | --- | --- | --- | --- | --- | --- | --- | --- |
|  | (number) | (mm) | 2 rpm | 20 rpm | 2 rpm | 20 rpm | 2 rpm | 20 rpm |
| Ex. 1 | 0 | 0 | 1802 | 310 | 1830 | 316 | 101.6 | 101.9 |
| Ex. 2 | 0 | 0 | 1886 | 330 | 1958 | 330 | 103.8 | 100.0 |
| Ex. 3 | 0 | 0 | 1634 | 282 | 1668 | 292 | 102.1 | 103.5 |
| Ex. 4 | 0 | 0 | 1854 | 326 | 1864 | 330 | 100.5 | 101.2 |
| Ex. 5 | 0 | 0 | 1792 | 310 | 1890 | 328 | 105.5 | 105.8 |
| Ex. 6 | 4 | 0 | 1958 | 382 | 1964 | 384 | 100.3 | 100.5 |
| C.E. 1 | 40 | 33 | 1730 | 326 | 2104 | 374 | 121.6 | 114.7 |
| C.E. 2 | 20 | 21 | 1620 | 318 | 1854 | 352 | 114.4 | 101.7 |
| C.E. 3 | 31 | 13 | 1700 | 320 | 2078 | 404 | 122.2 | 126.3 |
| C.E. 4 | 35 | 17 | 1818 | 368 | 2114 | 440 | 116.3 | 119.6 |
| C.E. 5 | 46 | 41 | 1562 | 346 | 1892 | 468 | 121.1 | 135.3 |

It can be seen from Table 7 that the dispersibility of the surface-coated calcium carbonate particles obtained in Examples 1 to 6 in the two-component modified silicone sealants is excellent, and that the two-component modified silicone sealants containing the surface-coated calcium carbonate particles obtained in Examples 1 to 6 all have excellent adhesion and viscosity stability.

Text Example 5

TABLE 8

| Component | Weight parts |
| --- | --- |
| Base | |
| urethane polymer | 100 |
| Curing agent | |
| Polyol | 50 |
| diisononyl phthalate | 50 |

TABLE 8-continued

| Component | Weight parts |
| --- | --- |
| tin octylate | 0.05 |
| surface-coated calcium carbonate particles | 150 |

Urethane polymer: trade name Takenate L-1032, a product of Takeda Chemical Industries, Ltd.
Polyol: trade name Takelac P-74, a product of Takeda Chemical Industries, Ltd.

Two-component polyurethane sealants were prepared from the components in Table 8 for the various surface-coated calcium carbonate particles obtained in the above Examples 1 to 6 and Comparative Examples 1 to 5.

Next, the dispersibility of the surface-coated calcium carbonate particles in the two-component polyurethane sealant and the adhesion between the two-component polyurethane sealant and an adherend made of brass were tested, and the viscosity stability of the two-component polyurethane sealant was also tested, in the same manner as in Test Example 1.

The results are given in Table 9.

TABLE 9

|  | Dispersibility | Adhesion | Initial viscosity (Pa · s) | | Viscocity after 7 days at 45° C. (Pa · s) | | Increase in viscosity (%) | |
| --- | --- | --- | --- | --- | --- | --- | --- | --- |
|  | (number) | (mm) | 2 rpm | 20 rpm | 2 rpm | 20 rpm | 2 rpm | 20 rpm |
| Ex. 1 | 0 | 0 | 3312 | 440 | 3340 | 450 | 100.8 | 102.3 |
| Ex. 2 | 0 | 0 | 3500 | 472 | 3606 | 478 | 103.0 | 101.3 |
| Ex. 3 | 0 | 0 | 3028 | 404 | 3230 | 408 | 106.7 | 101.0 |
| Ex. 4 | 0 | 0 | 3490 | 478 | 3576 | 498 | 104.2 | 104.2 |
| Ex. 5 | 0 | 0 | 3218 | 428 | 3220 | 434 | 100.1 | 101.4 |
| Ex. 6 | 3 | 0 | 3442 | 472 | 3572 | 494 | 103.8 | 104.7 |
| C.E. 1 | 31 | 30 | 3194 | 456 | 3858 | 528 | 120.8 | 115.8 |
| C.E. 2 | 21 | 11 | 3000 | 428 | 3318 | 468 | 110.6 | 109.3 |
| C.E. 3 | 18 | 13 | 3222 | 496 | 4080 | 656 | 126.6 | 132.3 |
| C.E. 4 | 22 | 9 | 3284 | 530 | 3852 | 596 | 117.3 | 112.5 |
| C.E. 5 | 57 | 29 | 2916 | 428 | 3502 | 552 | 120.1 | 129.0 |

It can be seen from Table 9 that the dispersibility of the surface-coated calcium carbonate particles obtained in Examples 1 to 6 in the two-component polyurethane sealants is excellent, and that the two-component polyurethane sealants containing the surface-coated calcium carbonate particles obtained in Examples 1 to 6 all have excellent adhesion and viscosity stability.

What is claimed is:

1. Surface-coated calcium carbonate particles, in which the calcium carbonate particles are coated with a fatty acid mixture and the fatty acid mixture coated-calcium carbonate particles are then further coated with an organic compound, the fatty acid mixture comprising (1A) at least one compound selected from the group consisting of saturated fatty acids and salts thereof and (1B) at least one compound selected from the group consisting of unsaturated fatty acids and salts thereof, the (1A):(1B) weight ratio being in the range of 30:70 to 70:30, the coating amount of the fatty acid mixture being about 1 to about 3 mg per square meter of surface area of the surface-coated calcium carbonate particles, and the organic compound being at least one member selected from the group consisting of phthalic esters, phosphoric esters, adipic esters, sebacic esters, azelaic esters, trimellitic esters and metal alkoxides, the coating amount of the organic compound being about 0.1 to about 1 mg per square meter of surface area of the surface-coated calcium carbonate particles.

2. The surface-coated calcium carbonate particles according to claim 1, wherein the surface area of the surface-coated calcium carbonate particles is about 10 to about 40 m$^2$/g, the peak for primary pore diameter on a pore diameter distribution curve measured by mercury porosimetry is about 0.03 to about 0.08 μm, and the primary pore volume is about 0.1 to about 0.5 cm$^3$/g.

3. The surface-coated calcium carbonate particles according to claim 1, wherein the component (1A) is at least one member selected from the group consisting of caproic acid, caprylic acid, capric acid, lauric acid, myristic acid, palmitic acid, stearic acid, arachic acid, behenic acid, lignoceric acid, cerotic acid, montanic acid, melissic acid and salts thereof.

4. The surface-coated calcium carbonate particles according to claim 3, wherein the component (1A) is at least one member selected from the group consisting of palmitic acid, stearic acid, lauric acid, sodium palmitate, sodium stearate and sodium laurate.

5. The surface-coated calcium carbonate particles according to claim 1, wherein the component (1B) is at least one member selected from the group consisting of oleic acid, palmitoleic acid, erucic acid, caproleic acid, linderic acid, eicosenic acid, linoleic acid, hiragoic acid, linolenic acid, arachidonic acid, tariric acid and salts thereof.

6. The surface-coated calcium carbonate particles according to claim 5, wherein the component (1B) is at least one member selected from the group consisting of oleic acid, erucic acid, sodium oleate and sodium erucate.

7. The surface-coated calcium carbonate particles according to claim 1, the weight ratio of the component (1A) the component: (1B) being in the range of 35:65 to 65:35.

8. The surface-coated calcium carbonate particles according to claim 1, wherein the coating amount of the fatty acid mixture (1) is about 1.5 to about 2.5 mg per square meter of surface area of the surface-coated calcium carbonate particles.

9. The surface-coated calcium carbonate particles according to claim 1, wherein the organic compound (2) is at least one member selected from the group consisting of phthalic esters, phosphoric esters and adipic esters.

10. The surface-coated calcium carbonate particles according to claim 9, wherein the organic compound (2) is at least one member selected from the group consisting of diisononyl phthalate, tricresyl phosphate and polypropylene adipate.

11. The surface-coated calcium carbonate particles according to claim 1, wherein the coating amount of the organic compound (2) is about 0.15 to about 0.5 mg per square meter of surface area of the surface-coated calcium carbonate particles.

12. An adhesive comprising the surface-coated calcium carbonate particles according to claim 1.

13. A method for imparting excellent viscosity stability and adhesion to an adhesive by adding the surface-coated calcium carbonate particles according to claim 1 to an adhesive.

14. Surface-coated calcium carbonate particles obtainable
by coating the calcium carbonate particles with a fatty acid mixture (1) comprising (1A) at least one compound selected from the group consisting of saturated fatty acids and salts thereof and (1B) at least one compound selected from the group consisting of unsaturated fatty acids and salts thereof, the (1A):(1B) weight ratio being in the range of 30:70 to 70:30, and the coating amount of the fatty acid mixture being about 1 to about 3 mg per square meter of surface area of the surface-coated calcium carbonate particles, and then by coating the fatty acid mixture-coated calcium carbonate particles with (2) at least one organic compound selected from the group consisting of phthalic esters, phosphoric esters, adipic esters, sebacic esters, azelaic esters, trimellitic esters and metal alkoxides, the coating amount of the organic compound being about 0.1 to about 1 mg per square meter of surface area of the surface-coated calcium carbonate particles.

15. A method for producing surface-coated calcium carbonate particles, comprising the steps of:

coating the calcium carbonate particles with (1) a fatty acid mixture comprising (1A) at least one compound selected from the group consisting of saturated fatty acids and salts thereof and (1B) at least one compound selected from the group consisting of unsaturated fatty acids and salts thereof, the (1A):(1B) weight ratio being in the range of 30:70 to 70:30, and the coating amount of the fatty acid mixture being about 1 to about 3 mg per square meter of surface area of the surface-coated calcium carbonate particles, and coating with (2) at least one organic compound selected from the group consisting of phthalic esters, phosphoric esters, adipic esters, sebacic esters, azelaic esters, trimellitic esters and metal alkoxides, the coating amount of the organic compound being about 0.1 to about 1 mg per square meter of surface area of the surface-coated calcium carbonate particles.

* * * * *